(12) United States Patent
Armstrong et al.

(10) Patent No.: US 11,687,307 B2
(45) Date of Patent: Jun. 27, 2023

(54) SYNCHRONIZATION BETWEEN SCREENS

(71) Applicant: Cubic Corporation, San Diego, CA (US)

(72) Inventors: Martyn Armstrong, Salisbury (GB); Neale Smiles, Salisbury (GB); Alastair Parkinson, Salisbury (GB); Robert Michael Spriggs, Melksham (GB); Rod Tuckwell, Salisbury (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 17/341,174

(22) Filed: Jun. 7, 2021

(65) Prior Publication Data

US 2021/0382674 A1 Dec. 9, 2021

Related U.S. Application Data

(60) Provisional application No. 63/035,880, filed on Jun. 8, 2020.

(51) Int. Cl.
| | |
|---|---|
| *G06F 3/14* | (2006.01) |
| *G06F 3/16* | (2006.01) |
| *G10L 15/22* | (2006.01) |
| *G06F 3/01* | (2006.01) |
| *G06T 15/00* | (2011.01) |
| *G10L 15/18* | (2013.01) |

(52) U.S. Cl.
CPC ............ *G06F 3/1423* (2013.01); *G06F 3/011* (2013.01); *G06F 3/167* (2013.01); *G06T 15/00* (2013.01); *G10L 15/18* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2014/0328597 | A1* | 11/2014 | Bhide | H04B 10/1121 398/118 |
| 2015/0052476 | A1* | 2/2015 | Nakao | G06F 3/04845 715/794 |
| 2017/0228784 | A1* | 8/2017 | Singh | H04L 67/52 |
| 2020/0005661 | A1 | 1/2020 | Armstrong et al. | |
| 2020/0158471 | A1 | 5/2020 | Armstrong et al. | |
| 2021/0307605 | A1* | 10/2021 | Gur | G02B 27/0172 |
| 2022/0049971 | A1* | 2/2022 | Lee | G06V 20/20 |

* cited by examiner

*Primary Examiner* — Yi Wang
(74) *Attorney, Agent, or Firm* — Mughal IP P.C.

(57) ABSTRACT

The system comprises a first display mounted in a fixed position, a computer system coupled to the first display and a handheld computing device, wherein the first display is larger than the second display, the first display has a wider field of view than the second display, the first display establishes an optical link with the second display, the first display and the second display renders a virtual reality model of a scene with moving objects and asynchronous visual events. The handheld computing device is configured to scan machine-readable code embedded in asynchronous visual events, the result of scanning indicates location of the asynchronous visual events and transmits the location of the synchronous visual events to one or more remote computing devices using one or more wireless link, and in response to transmission of the location, modify the virtual reality model of the scene rendered on the first display.

21 Claims, 7 Drawing Sheets

SYNCHRONIZATION BETWEEN SCREENS

This application claims the benefit of and is a non-provisional of U.S. Provisional Application Ser. No. 63/035,880 filed on Jun. 8, 2020, which is hereby expressly incorporated by reference in its entirety for all purposes.

BACKGROUND

In military environment, a forward observer for example, a Joint Fires Observer (JFO) or an observer surveys a battlefield and gives orders to one or more remote artillery units to fire on an observed target. While the artillery units can be at a distance away, the observer can be much closer to a target to be able to observe the target. The orders that the observer can provide to the artillery units can include location information, number of rounds to fire, a type of round, and the like. Further, during mission-critical operation, performance of the observer is imperative for the success of the mission]

Observer training is often connected by virtual reality models in classrooms. In the traditional training system, a virtual reality model of a scene depicting a battlefield can be shown on a display, with a target. One or more trainees, or teams of trainees, use Target Acquisition System (TAS) equipment for example, specialized binoculars, a laser, a map, compass, etc. to provide orders to remote artillery units in the scene. A virtual reality model of the scene on the display shows where, in the scene, the artillery rounds land. For example, explosive rounds, can show an explosion on the display. Because the artillery can miss the target due to wind and/or other meteorological factors, the observer training often involves the observer providing an order to fire an initial round at the target, followed by orders providing corrections, to ensure the rounds hit the target. The observer needs to give the orders quickly to help ensure the effectiveness of the artillery, so a goal of the observer training, therefore, is to ensure that the observers get rounds onto the target as quickly and efficiently as possible. In the traditional training systems, however, the training can be limited to one trainee or a team providing the orders at a particular time. Moreover, for training scenarios with multiple trainees, it can take a longer time to rotate through multiple individuals or teams and provide individualized feedback.

SUMMARY

In one embodiment, the disclosure provides for a synchronization system providing synchronization between screens. The synchronization system comprises a first display mounted in a fixed position, a computer system coupled to the first display. The synchronization system further comprises a hand-held computing device, comprising a second display, wherein the first display is larger than the second display, the first display has a wider field of view than the second display, the first display establishes an optical link with the second display, the first display renders a virtual reality model of a scene with moving objects and asynchronous visual events, the scene and the asynchronous visual events rendered on the first display are also rendered on the second display. The synchronization system further comprises machine-readable code is embedded in synchronous visual events and is visually readable by the handheld computing device, the handheld computing device is configured to scan the machine-readable code, the result of scanning indicates location of the asynchronous visual events, the handheld computing device configured to transmit the location of the synchronous visual events to one or more remote computing devices using one or more wireless link, and in response to transmission of the location of the asynchronous visual events, modify the virtual reality model of the scene rendered on the first display.

In another embodiment, the disclosure provides method for providing synchronization between screens, the method comprising mounting a first display in a fixed position, coupling a computer system to the first display, establishing an optical link between the first display and the second display, wherein the second display is a part of a hand-held computing device, the first display is larger than the second display, the first display has a wider field of view than the second display. The method further comprises rendering a virtual reality model of a scene with moving objects and asynchronous visual events on the first display, wherein the scene and the asynchronous visual events rendered on the first display are also rendered on the second display, embedding a machine-readable code in asynchronous visual events, reading the machine-readable code by the handheld computing device, scanning the machine-readable code by the handheld computing device, wherein the machine-readable code indicates location of the asynchronous visual events based on the result of scanning, transmitting the location of the asynchronous visual events to one or more remote computing devices by the handheld computing device using one or more wireless link, and modifying the virtual reality model of the scene rendered on the first display in response to transmission of the location of the asynchronous visual events.

In yet another embodiment, the present disclosure provides computer-program product tangibly embodied in a non-transitory machine-readable storage medium, including instructions configured to cause a processing apparatus to perform operations. The operations comprise mounting a first display in a fixed position, coupling a computer system to the first display, establishing an optical link between the first display and the second display, wherein the second display is a part of a hand-held computing device, the first display is larger than the second display, the first display has a wider field of view than the second display. The method further comprises rendering a virtual reality model of a scene with moving objects and asynchronous visual events on the first display, wherein the scene and the asynchronous visual events rendered on the first display are also rendered on the second display, embedding a machine-readable code in asynchronous visual events, reading the machine-readable code by the handheld computing device, scanning the machine-readable code by the handheld computing device, wherein the machine-readable code indicates location of the asynchronous visual events based on the result of scanning, transmitting the location of the asynchronous visual events to one or more remote computing devices by the handheld computing device using one or more wireless link, and modifying the virtual reality model of the scene rendered on the first display in response to transmission of the location of the asynchronous visual events.

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
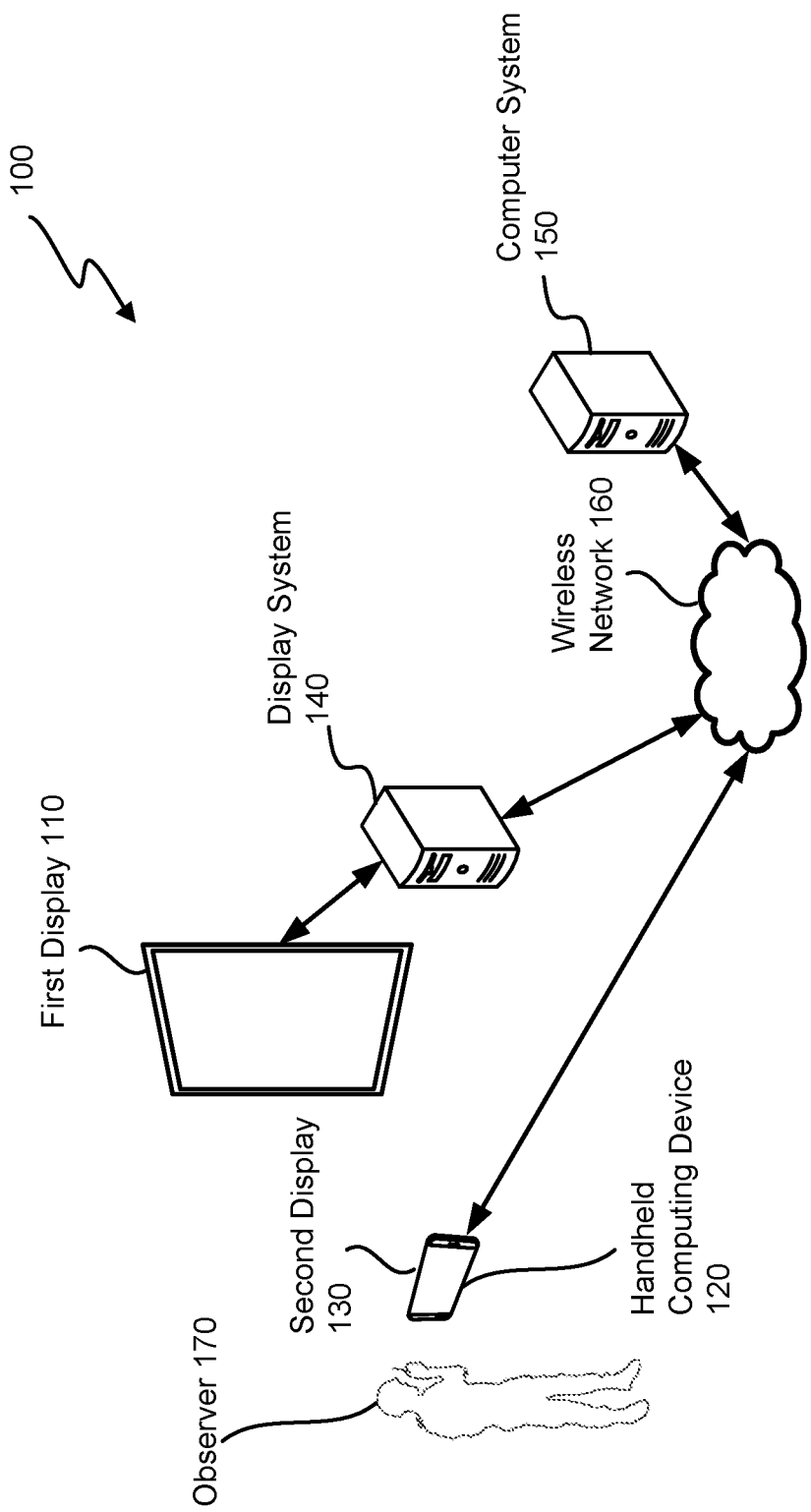
FIG. 1 illustrates a block diagram of a synchronization system for providing synchronization between two screens, in accordance with one embodiment of the present disclosure.

Referring to FIG. 1, illustrates a synchronization system 100 of an embodiment, configured to provide synchronization between screens. The synchronization system 100 provides training to an observer 170 who can observe a scene including moving objects and asynchronous visual events. A number of remote artillery units 180 decide to take one or more actions based on instructions received by the observer 170.

The synchronization system 100 includes a first display 110 and a handheld computing device 120 comprising a second display 130. The second display 130 is a display of the handheld computing device 120. In an embodiment the second display 130 can be a touchscreen display. In an embodiment, the first display 110 is connected to a display system 140. In another embodiment, the display system 140 is integrated inside the first display 110 and no separate display system 140 is provided.

The first display 110 is connected to a computer system 150. The computer system 150 renders information related to a virtual reality model to the display system 140, which renders a virtual reality model relating to the scene on the first display 110. The display system 140, the computer system 150 and the computing device 120 communicate with each other over a wireless network 160. The wireless network 160 may comprise public and/or wireless networks (which can include the Internet) that utilize any of a variety of wired and/or wireless communication technologies. The first display 110 is mounted in a fixed position. The first display 110 is a display larger than the second display 130. The first display 110 has a wider field of view than the second display 130. For example, the first display 110 may be an immersive display, a large screen television, a curved display, etc.

The first display 110 establishes an optical link with the second display 130. The optical link between the first display 110 and the second display 130 enables rendering of the virtual reality model of a scene on the first display 110 and the second display 130 simultaneously. The scene includes moving objects and asynchronous visual events.

The virtual reality model of the scene can include an actual representation of the battlefield. The virtual reality model of the scene shows the actual activities happening on the battlefield.

The display system 140 may include one or more virtual reality model generators. The one or more virtual reality model generators help render virtual reality models of the scene on the first display 110. The display system 140 may also include a memory (not shown) which can store a map of the scene. The one or more virtual reality model generator communicates with the memory (not shown) to fetch the map of the scene and render the virtual reality model of the map of the scene on the first display 110.

The handheld computing device 120 is used by one or more observers or trainees to view the virtual reality model of the scene rendered on the first display 110. The handheld computing device 120 is configured to receive an input from the observer 170, relay commands to the computer system 150, and provide a feedback to the observer 170. Each of the handheld computing device 120 is associated with an observer 170.

Figure 2:
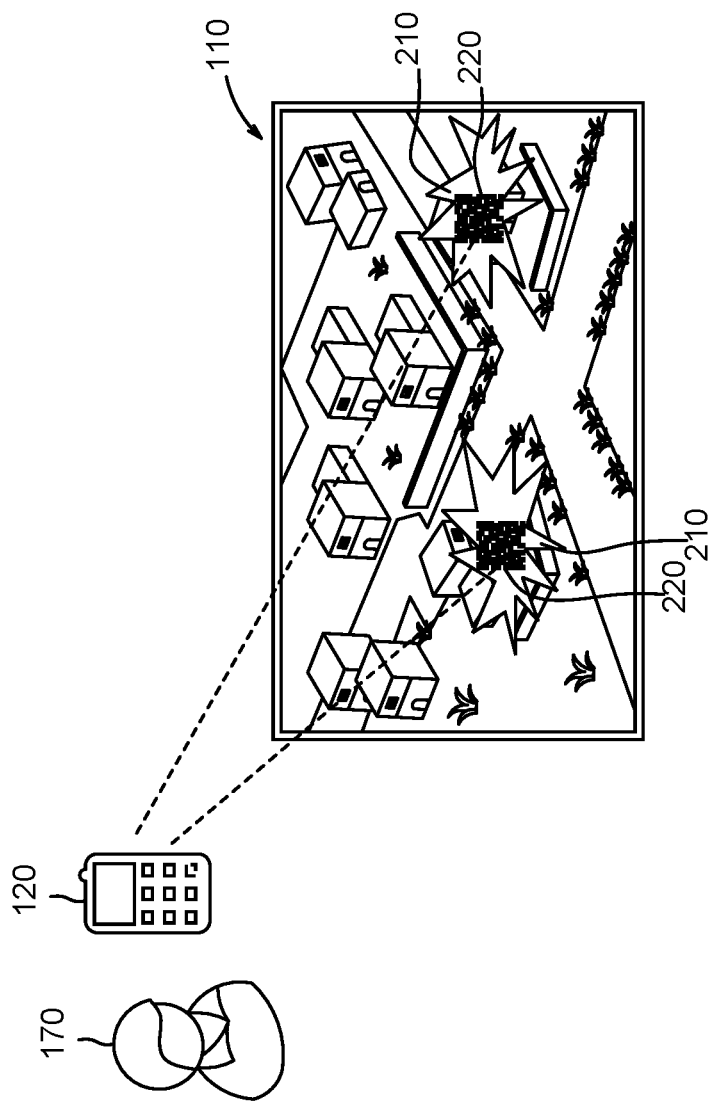
FIG. 2 illustrates an illustration of virtual reality model of a scene, in accordance with one embodiment of the present disclosure.

Referring to FIG. 2, illustrates a virtual reality model of an embodiment of the scene is shown as being rendered on the first display 110. The scene includes multiple three-dimensional structures of buildings or houses. Further, the scene includes an empty space around the three-dimensional structures. In reality, during a battle, multiple troops of army called target troops and remote troops (remote artillery units) can be present inside the scene. In this scenario, the target troops attack the remote troops. The observer 170 is associated with the remote troops which can be present inside the battlefield to observe the movement of the target troops while the remote troops are away from the battlefield and can wait for instructions received from the observer 170.

The scene rendered on the first display 110 shows one or more asynchronous visual events 210 from the target troops. The asynchronous visual events 210 may include explosions or any other fireworks. The handheld computing device 120 identifies a location of the asynchronous visual events and informs the location to remote computing devices.

The remote computing devices upon receiving the location of the asynchronous visual events take one or more actions to keep the target troops away. The location of the asynchronous visual events are detected by machine-readable codes 220 embedded inside the asynchronous visual events 210.

Thus, the handheld computing device 120 (or observer 170) acts as a guide for the remote troops.

Figure 3:
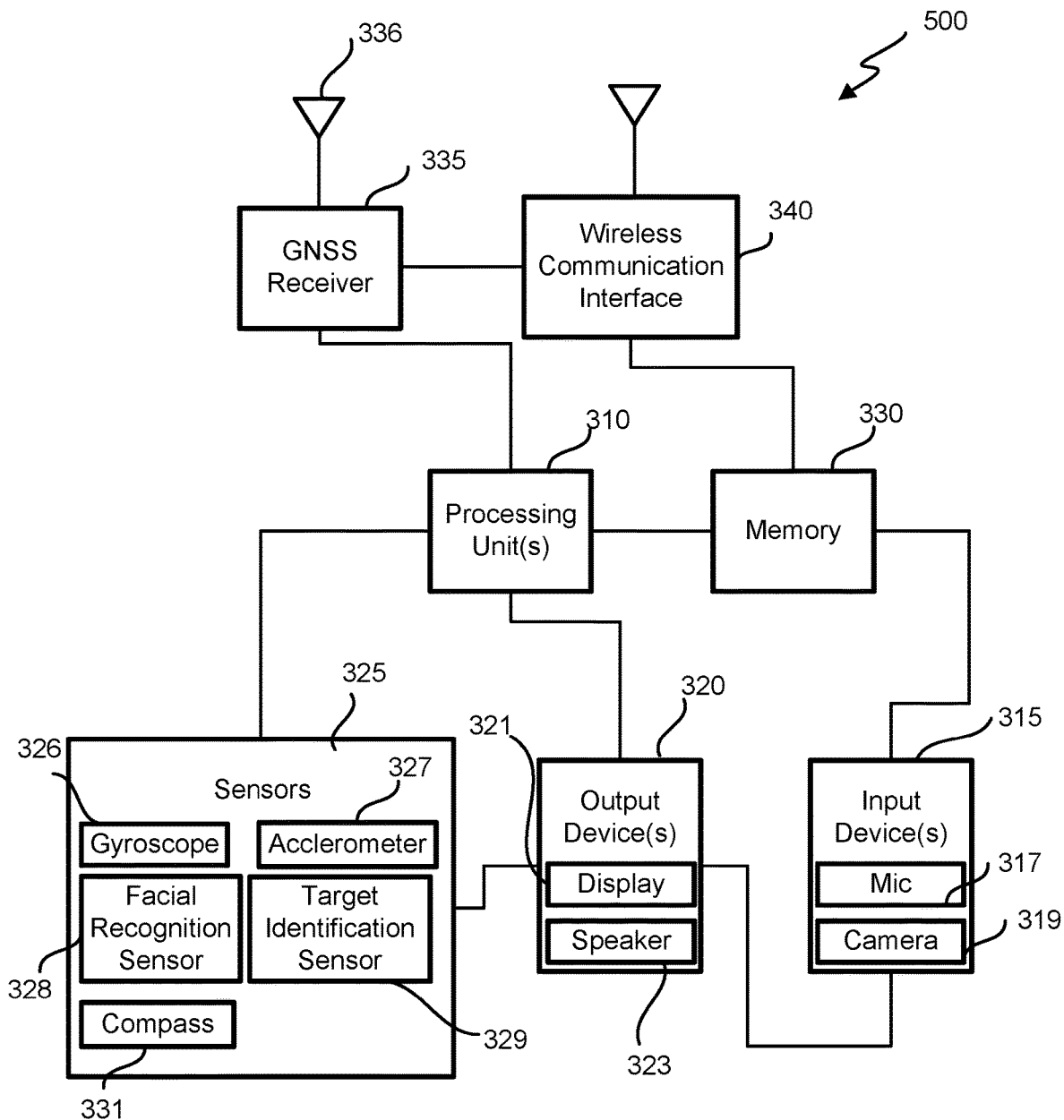
FIG. 3 illustrates a block diagram of a handheld computing device, in accordance with one embodiment of the present disclosure.

Referring to FIG. 3, a block diagram of an embodiment of the handheld computing device 120 is shown.

The handheld computing device 120 comprises of a processing unit(s) 310, a memory 330, a GNSS receiver 335, a wireless communication interface 340, input device(s) 315, output device(s) 320 and a plurality of sensors 325. The handheld computing device 120 further comprises a bus 305 for connecting the components of the handheld computing device 120.

The GNSS receiver 335 is used to identify location of the handheld computing device 120. The location of the handheld computing device 120 may be identified so that distance between the asynchronous visual events or remote computing devices and handheld computing device 120 can be identified. The GNSS receiver 335 can include an antenna module 336 to help identify location of the handheld computing device 120.

The wireless communication interface 340 can act as a transceiver and can be used to transmit or receive communication. The communication can include transmitting coordinates to the remote computing devices, receiving messages/commands from the remote computing devices, etc.

The input device(s) 315 may include microphone 317 and camera 319. The microphone 317 can be used to send voice commands to the remote computing devices. Similarly, the camera 319 can be used to send one or more image of the scene to the remote computing devices.

The output device(s) 320 may include a display 321 and speaker 323. The display is the second display 130 and is used to render the virtual reality model of the scene including moving objects and asynchronous visual events. The speaker 323 can be used to listen to the audio of users in the remote artillery units. The speaker 323 can also be used to listen to the feedback provided to the observer 170 by the synchronization system 100.

The plurality of sensors 325 performs different operations to help the observer 170 in the scene. For example, the gyroscope sensor 326 and accelerometer sensor 327 together help determine the position and movement of the handheld computing device 120. The facial recognition sensor 328 helps recognize the if any observer 170 is present. For example, based on the recognition of the presence of the observer 170, different actions can be recommended. In other words, if it is recognized that the observer 170 is looking at the handheld computing device 120, i.e., if the presence of the observer 170 is detected, the scene rendered on the handheld computing device 120 can be transformed into different modes (explained in FIG. 7).

Further, the target identification sensor 329 identifies the target in the scene. For example, the target identification sensor 329 identifies the presence of the target on the battlefield. For this, the target identification sensor 329 scans machine readable codes embedded in the asynchronous visual events present in the scene. The machine-readable codes may include, for example, QR codes.

These machine-readable codes are generated as soon as the asynchronous visual event occurs in the scene. The machine-readable codes have information stored in them. The information relates the coordinates of the asynchronous visual event. The coordinates can be defined in x-axis, y-axis and z-axis. The location can help in determining the location of the target in the scene.

Once the handheld computing device 120 scans the machine-readable codes, the coordinates are transmitted to the remote computing devices. The remote computing device can be associated with remote artillery units. The remote artillery units may decide to take one or more actions against the target.

The handheld computing device 120 transmits the coordinates using one or more wireless link.

Figure 4:
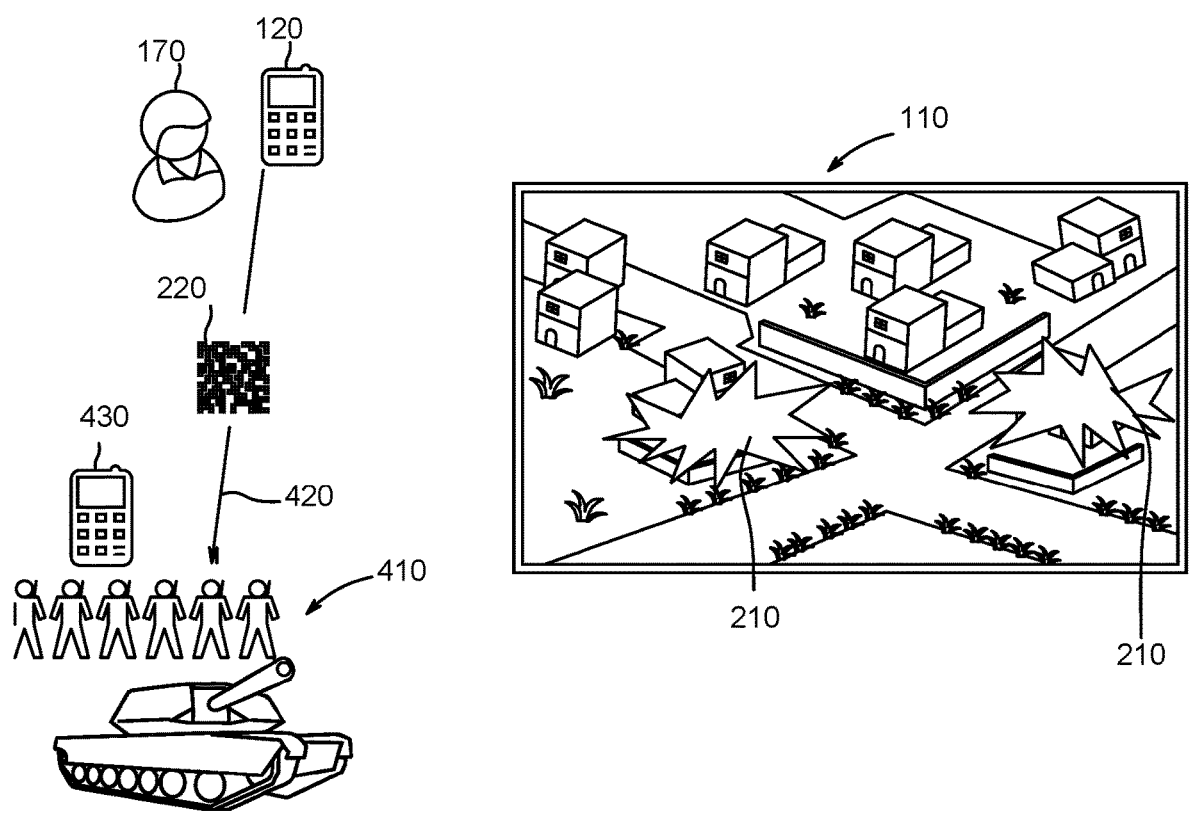
FIG. 4 illustrates communication of the handheld computing device with remote computing devices, in accordance with one embodiment of the present disclosure.

FIG. 4 illustrates an embodiment for transmission of coordinates from the handheld computing device 120 to remote computing devices 430 (used by remote artillery units 410) using one or more wireless link 420. The one or more wireless link 420 includes transmission via messaging or via voice commands.

The messaging can be performed using short codes or short forms of one or more words. The messaging includes commands sent from the handheld computing device 120. The commands can include one or more actions suggested by the observer 170. The actions can include firing at the targets in the battlefield or moving in a pre-defined direction towards the target troops.

The voice commands can also be used to transmit communication from the handheld computing device 120 to the remote computing devices. The voice commands can include one or more verbal instructions to be taken by the remote computing devices 430 or remote artillery units 410 associated with the remote computing devices 430. The voice commands include using natural language processing techniques. For example, the handheld computing device 120 can use Natural Language Processing (NLP) to determine a verbal command provided by the observer 170. In some embodiments, the verbal command can be transmitted in accordance with a particular command protocol, such as Fire Discipline. The command is then provided to the first display 110 by the handheld computing device 120, which further generates the corresponding effects such as an explosion on the battlefield at a point of impact.

In one embodiment, the voice commands can also be converted into textual format and transmitted to the remote computing devices. The conversion can occur in the handheld computing device 120 or in the remote computing devices 430.

In one embodiment, the handheld computing device 120 can use satellite communication to transmit the coordinates to the remote computing devices.

Figure 5:
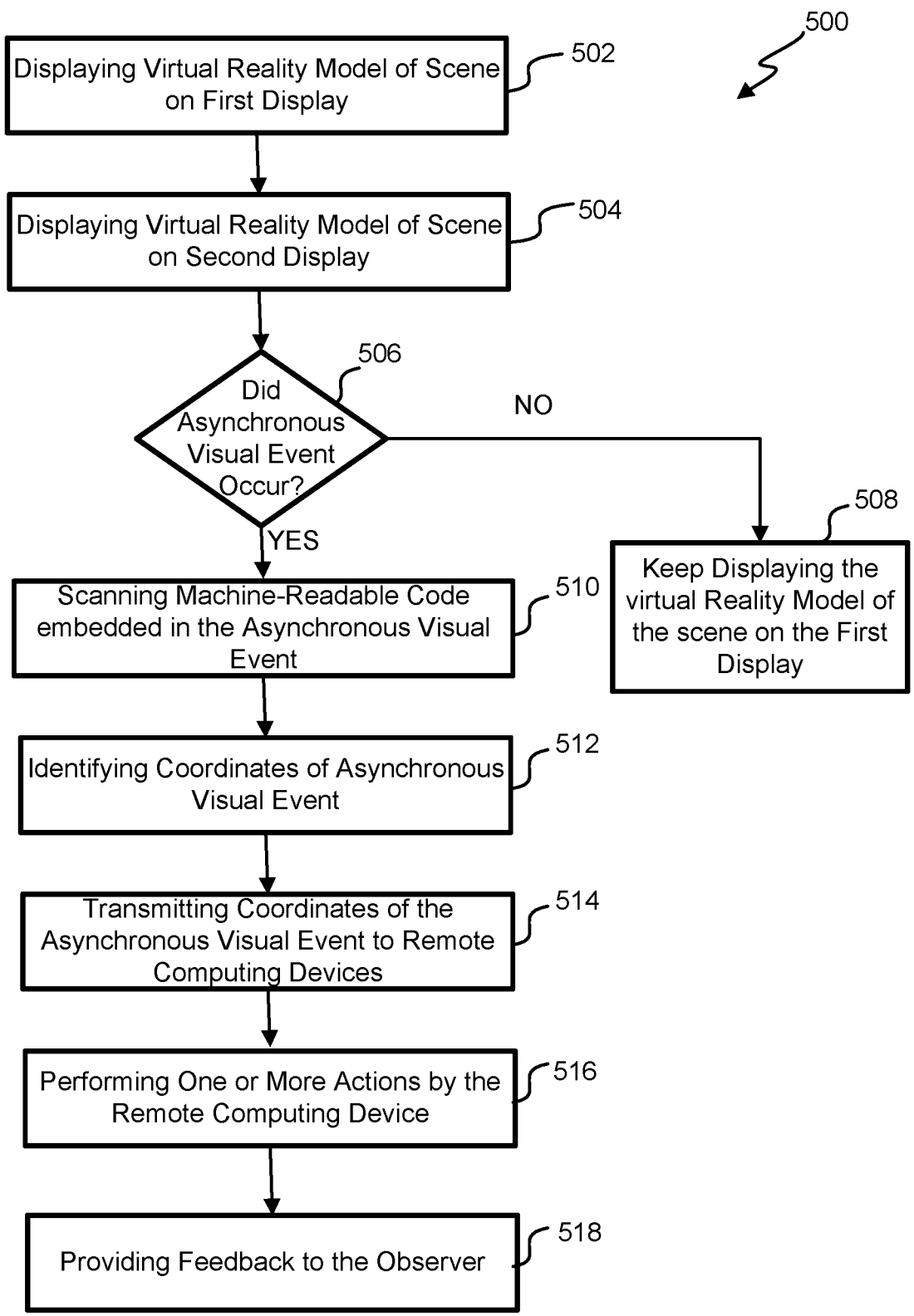
FIG. 5 illustrates a flow diagram of a method for training an observer for field artillery, in accordance with one embodiment of the present disclosure.

FIG. 5 illustrates, a flowchart of an embodiment for a training method 500 providing training to the observer 170 using virtual reality model of the scene. The method 500 provides a training of the observer 170 for real time scenarios occurring in battlefield. The method 500 enables the training of the observer 170 such that the observer 170 is able to inform the remote artillery about any explosions by the enemy troops.

In a battlefield scenario, the observer 170 can observe the battlefield. In battlefield, the observer 170 is present to observe the battlefield and is proactive of the remote artillery units in the battlefield. The role of observer 170 is to keep the remote artillery units updated about the movement of the enemy troops. In a training environment, the observer 170 is trained by rendering a real field view of the battlefield. For this, a virtual reality model of the battlefield is provided.

The depicted portion of the method 500 starts at block 502, where the virtual reality model of the scene of a battlefield is rendered on the first display 110.

The virtual reality model of the scene is provided on the first display 110 which is coupled to the computer system 150. The computer system 150 includes a memory (not shown) which stores files for generating the virtual reality model of the scene. The display system 140 fetches the files from the memory (not shown) of the computer system 150 and renders the virtual reality model of the scene on the first display 110.

The scene as rendered on the first display 110 is also rendered on the second display 130 using the optical link established between the first display 110 and the second display 130 (block 504). The optical link can be a virtual connection established between the first display 110 and the second display 130. This optical link helps provide synchronization between the first display 110 and the second display 130 such that any lag created for rendering content between the first display 110 and the second display 130 can be avoided. Thus, the virtual reality model of the scene as displayed on the first display 110 is also rendered on the second display 130. This helps the observer 170 to observe the scene on the second display 130 present on the handheld computing device 120 available with the observer 170.

At block 506, the handheld computing device 120 determines if there are any asynchronous visual events occurring in the virtual reality model of the scene. The asynchronous virtual event includes explosions, gun fire, etc. occurring in the scene by the enemy troops.

If no asynchronous visual events occur in the virtual reality model of the scene, the handheld computing device 120 keeps displaying the virtual reality model of the scene and waits for any asynchronous visual events to occur (block 508).

However, as soon as any asynchronous visual event occur in the virtual reality model of the scene, the handheld computing device 120 identifies the location of the asynchronous visual event so that the handheld computing device 120 informs the location to the remote computing devices. At block 510, the location of the asynchronous visual events is identified using scanning operation performed by the handheld computing device 120.

The handheld computing device 120 uses a target identification sensor 329 to perform scanning operation. As soon as any asynchronous visual event occurs in the virtual reality model of the scene, machine-readable codes are generated. The machine-readable codes are embedded inside the asynchronous visual events. The machine-readable codes include QR codes. For example, QR codes can be embedded in the explosions occurring in the scene (as shown in FIG. 2). The QR codes includes information regarding the coordinates of the asynchronous visual events. As soon as the handheld computing device 120 performs scanning operation of the machine-readable codes, the coordinates of the asynchronous visual events are identified (block 512). The coordinates are fetched and stored in the memory 330. The stored coordinates are transmitted to the remote computing devices using wireless communication interface 340.

At block 514, the handheld computing device 120 transmits the coordinates to the remote computing devices available with the remote artillery units. At block 516, based on the coordinates, the remote artillery units take one or more actions. Thus, the coordinates help decide the remote artillery units to take one or more actions.

The one or more actions can include transforming content present in the scene being rendered on the first display 110. The transformation can include producing visual effects related to firing events on the targets by the remote artillery units. The transformation can also include showing visual effects which provides indication that the machine-readable codes have been successfully scanned by the handheld computing devices 120.

The one or more actions can further include a target designation. The target designation can vary, depending on desired functionality. In some embodiments, for example, the first display 110 can designate a target for the observer 170 to fire on. The target designation can be shown visually in the second display 130 or otherwise communicated to the observer 170. According to some embodiments, the target designation can be provided by the training application executed on the handheld computing device 120. The training application can obtain information regarding a scene shown on the second display 130 and can designate a target thereon. The determination of the target to designate can be based on any of a variety of factors. For example, designation of the target can be random or can use a predetermined algorithm. Additionally, the designation can be based on mission type, can take into account target designations for other users, and so forth. In some embodiments, the observer 170 uses the handheld computing device 120 to manually designate target. For example, by touching the target in the scene displayed by the second display 130.

At block 518, the handheld computing device 120 provides feedback to the observer 170. The feedback provided to the observer 170 could vary, depending on desired functionality, this skill being taught, and/or other factors. For example, in some embodiments, the handheld computing device 120 can provide verbal or text instructions (e.g., "you need to apply a correction of R200, A50"). Additionally, or alternatively, a feedback may comprise visual guidance on the second display 130 of the handheld computing device 120, which could indicate corrections that need to be made. The feedback can occur during training and/or after training. For example, in some embodiments, the handheld computing device 120 calculates a right correction based on a point of impact where the asynchronous visual event has occurred and where the target is (using object recognition on the scene being rendered on the second display 130). After receiving verbal orders from the observer 170, the handheld computing device 120 compares what the orders with the calculated correction and provide instant feedback and/or log at the user's error for subsequent feedback and/or analysis. The handheld computing device 120 provides feedback after each correction and/or after the mission and can conduct an analysis of performance of the observer 170 over a mission. For example, indicating the performance was good if a user hit the target on three corrections, or poor if a user took 10 corrections to the target.

According to some embodiments, the training application executed by the handheld computing device 120 leads the observer 170 through different missions in order to develop new skills. Initial skills can simply be to bring rounds "online" centered on the target between right and left and additional skills can be add/drop skills by achieving the proper distance. Additional skills are taught through additional missions. This includes determining a correct number of rounds, the proper type of round weaponizing following a fire plan in which a longer-term mission calls for a particular firing sequence, and so forth. Depending on desired functionality, the handheld computing device 120 provides instant feedback (e.g., for basic skills) and/or permit the observer 170 to run throughout an mission or fire plan while logging data from the performance, then provide feedback afterward.

Additionally, or alternatively, the synchronization system 100 can pause the training to provide feedback. There can be some point during the training, for example, where it can be valuable to pause the simulation and provide feedback to the observer 170. Thus, embodiments can permit the handheld computing device 120 to pause the training and request feedback from the synchronization system 100. Additionally, or alternatively, the training application can be programmed to automatically pause the training when these points during the training are recognized.

The training can be classroom-based, permitting multiple users (observers) to participate in a training session simultaneously, where each user (observer 170) uses a respective handheld computing device 120 to. Workgroups are used, may include an observer, an assistant, and a signaler; and the observer and assistant can use the handheld computing device 120 to observe the battlefield and perform a "two-man check" before orders are given. (In some embodiments, the signaler can have a separate handheld computing device 120.)

Additionally, or alternatively, the synchronization system 100 can permit for distributed training, where multiple observers 170 or teams can be in separate locations looking at separate first display 110. In such instances, the synchronization system 100 can have multiple first display 110 and multiple second display 120 communicatively coupled with the computer systems 150. Separate displays can be positioned in different classrooms dispersed geographically. Additionally, or alternatively, the handheld computing device 120 can comprise a personal device (e.g., a laptop or PC) that permits the observer 170 to engage in on-demand training at home or wherever desired.

As noted, the training application can use object recognition to identify objects in the scene rendered on the second display 130. Object recognition can be used to recognize asynchronous visual events (or explosions), along with other types of artillery rounds (e.g., smoke or illumination rounds), targets, or other objects shown in the second display 130. To enable the handheld computing device 120 to determine the coordinates of the various moving objects and asynchronous visual events shown on the second display 130 and calculate corrections, the handheld computing device 120 can be provided information regarding the scene and/or objects therein. For example, the training application can include information regarding multiple virtual reality models that are used during the training or can obtain this information from the computer system 150. This information can include scaling information (e.g., how distant objects are from each other) and object information (e.g., what objects are located on the battlefield, and where) to permit a handheld computing device 120 to recognize the objects when shown on the first display 110, determine their location within the scene, and determine scaling/distances between objects (e.g., based on object size, distance between objects, and so forth). The training application's ability to perform object recognition can permit the handheld computing device 120 to perform the functionality provided above in a training environment with the first display 110 and also permits the handheld computing device 120 be used in live trainings or during operation.

Figure 6:
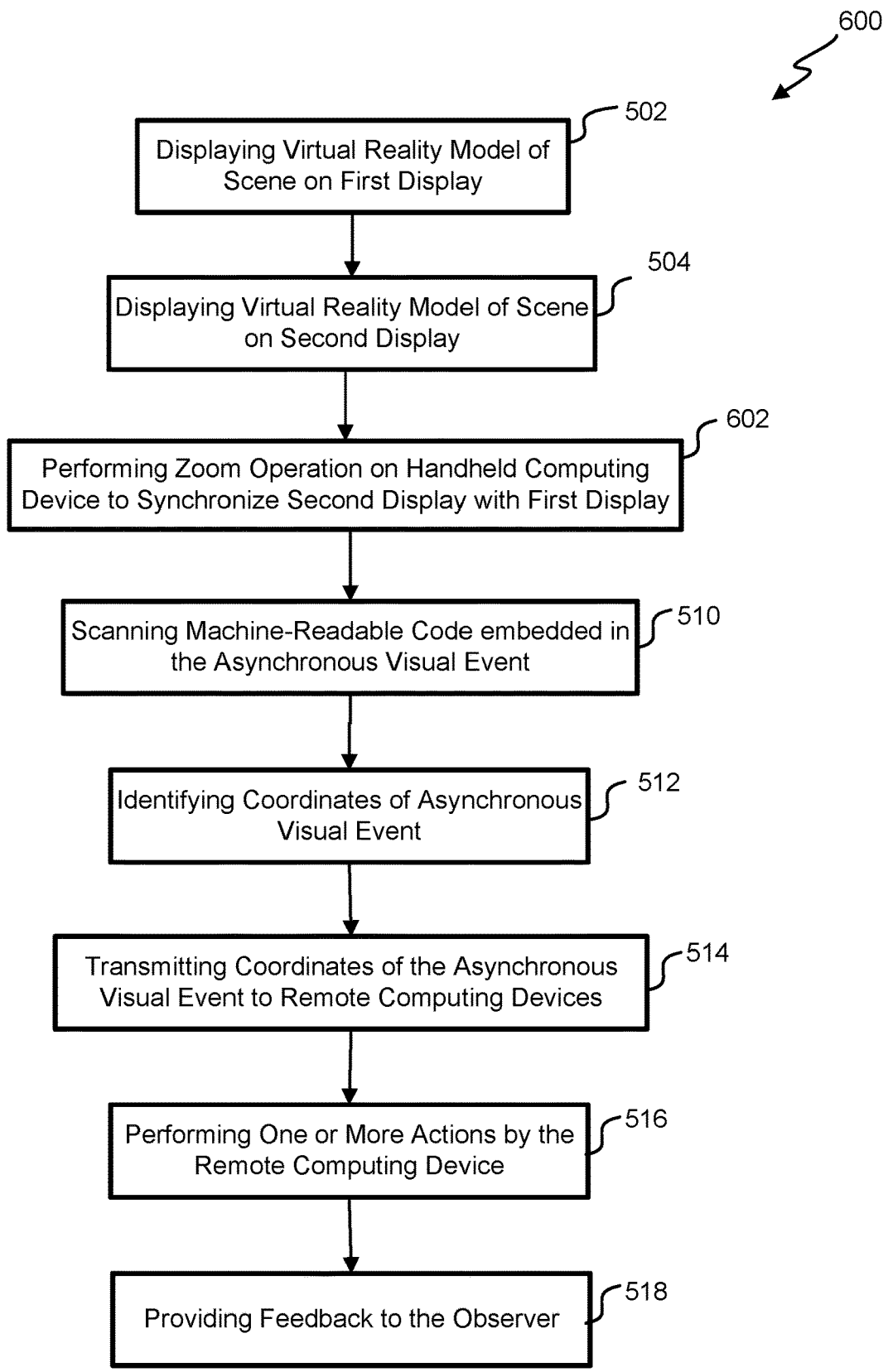
FIG. 6 illustrates a flow diagram of a method for synchronizing the first display and the second display, in accordance with one embodiment of the present disclosure.

Referring to FIG. 6, a flowchart of an embodiment of a synchronization method 600 for synchronization between the first display 110 and the second display 130 is shown. The synchronization of the first display 110 and the second display 130 reduces the lag between the rendering the content in parallel on the first display 110 and the second display 130.

The depicted portion of the method 600 starts at blocks 502 and 504, with the rendering of the virtual reality model of the scene on the first display and second display 130 available with the observer 170. The virtual reality model of the scene is rendered on the first display 110 and on the second display 130.

At block 602, the handheld computing device 120 performs a zoom operation on the second display 130. The zoom operation can be performed to calibrate the second display 130 with the first display 110 in a way such that the asynchronous visual events or explosions occurring on the first display 110 are visible to the observer 170 on the second display 130. In another embodiment, the zoom operation can be performed by the observer 170 as a pinch-to-zoom operation.

In yet another embodiment, the zoom operation can be performed automatically. For example, when an asynchronous visual event is detected to be occurring on the first display 110, the zoom operation can be performed automatically on the second display 130. This ensures that the observer 170 can view the machine-readable codes embedded in the asynchronous visual events.

The zoom operation enables the handheld computing device 120 to act as a binocular for the observer 170.

In the zoom operation, the handheld computing device 120, at block 510, performs scanning operation to scan the machine-readable codes embedded in the asynchronous visual event.

The scanning operations permits an identification of the location of the coordinates of the asynchronous visual events by reading the machine-readable codes embedded in the asynchronous visual events at block 512. The identified location of the coordinates is transmitted to remote computing devices at block 514.

At block 516, the remote computing devices decide to take actions on the location of the coordinates identified from the machine-readable codes. The action can include visual effects indicating firing at the location of the asynchronous visual events, movement of artillery units, movement of tanks or other related weapons.

At block 518, the handheld computing device 120 provides feedback to the observer 170.

Figure 7:
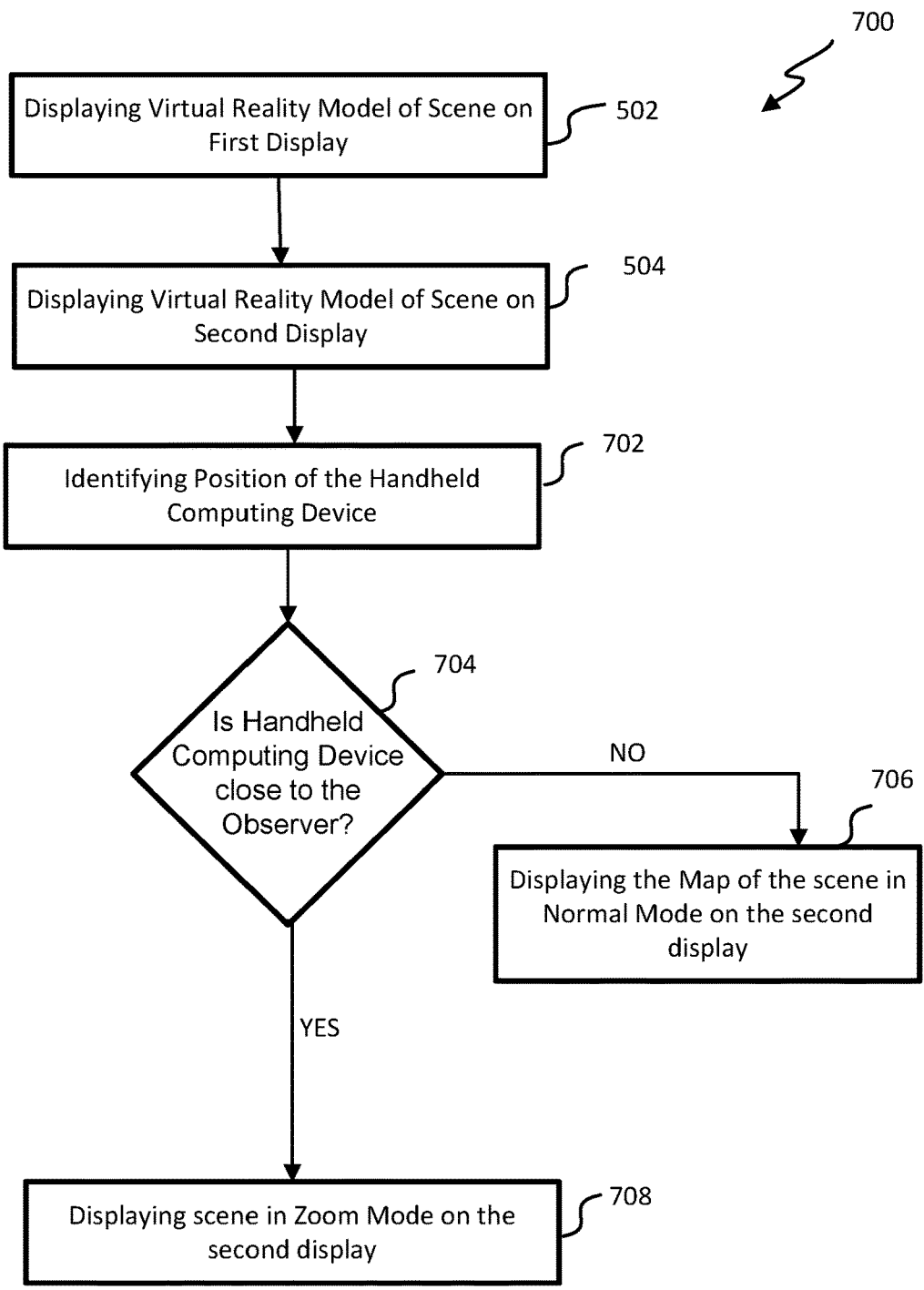
FIG. 7 illustrates a flow diagram of a method for transforming the handheld computing device in a binocular mode, in accordance with one embodiment of the present disclosure.

Referring to FIG. 7, a flowchart of an embodiment of a detection method 700 for detecting orientation of the handheld computing device 120 is shown. The depicted portion of the method 700, starts at block 502, when the observer 170 observes the virtual reality model of the scene including moving objects and the asynchronous visual events on the second display 130.

At block 702, the method 700 includes displaying virtual reality model of the scene on the first display 110 and the second display 130 (at blocks 502 and 504). At block, 702, the method includes identifying orientation of the handheld computing device 120. The orientation of the handheld computing device 120 is identified using the sensors 325 present on the handheld computing device 120. For example, the gyroscope sensor 326 and the accelerometer sensor 327 are used to identify if the handheld computing device 120 is near or away from the eyes of the observer 170.

Further, the facial recognition sensor 328 identifies presence of a face of the observer 170.

At block, 704, it is identified if the handheld computing device is closer to the eyes of the observer 170. In case the handheld computing device 120 is closer to the eyes of the observer 170 or if the face of the observer 170 is identified, the virtual reality model of the scene is rendered on the second display 130 in a zoom mode (block 708). For example, the battlefield displayed on the handheld computing device 120 is shown as being displayed in zoom mode. The zoom mode displays the content present on the second display 130 in a zoomed or enlarged view. This mode ensures that the handheld computing device 120 behaves as binoculars for the observer 170.

Further, in case the handheld computing device 120 is away from the eyes of the observer 170 or if the presence of the observer 170 is not detected, the virtual reality model of the scene displayed on the second display 130 is displayed in normal-mode (block 706). The normal-mode is the one which is not in zoom mode. By way of an example, it can be identified that the observer 170 is not looking at the second display, for example, can be drinking a glass of water, or talking to someone else. In that scenario, the second display 130 renders the scene in a normal-mode. In the normal-mode, the second display 130 can display the map of the battlefield. The second display 130 can also display a route from the current location of the observer 170 (or handheld computing device 120) or remote artillery units (or remote computing devices 430) to the location of the asynchronous events using GNSS receiver 335 and/or compass 331.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A synchronization system for providing synchronization between screens, the system comprising:
   a first display mounted in a fixed position;
   a computer system coupled to the first display; and
   a handheld computing device, comprising:
      a second display, wherein:
         the first display is larger than the second display;
         the first display has a wider field of view than the second display;
         the first display establishes an optical link with the second display;
         the first display renders a virtual reality model of a scene with moving objects and asynchronous visual events;
         the scene and the asynchronous visual events rendered on the first display are rendered on the second display;
         a machine-readable code is embedded in asynchronous visual events and is visually readable by the handheld computing device;
         the handheld computing device is configured to:
            scan the machine-readable code having coordinates of the asynchronous visual events and coordinates of the moving objects within the scene;
            transmit the location coordinates of the asynchronous visual events and the coordinates of the moving objects within the scene to one or more remote computing devices using one or more wireless link; and
            in response to transmission of the coordinates of the asynchronous visual events and the coordinates of the moving objects within the scene,
            transform the virtual reality model of the scene rendered on the first display.

2. The system for providing synchronization between screens as recited in claim 1, wherein:
   the transformation of the virtual reality model comprising producing visual effects on the first display; and
   the visual effects comprises firing by remote artillery units associated with the one or more remote computing devices, movement of the objects, indication that the scanning of the machine-readable codes has been successfully completed.

3. The system for providing synchronization between screens as recited in claim 1, wherein one or more wireless link includes messaging.

4. The system for providing synchronization between screens as recited in claim 1, wherein:
   one or more wireless link includes voice commands;
   the voice commands use Natural Language Processing (NLP) techniques for identifying verbal instructions present in the voice commands; and
   the verbal instructions indicate actions to be taken by the remote computing devices.

5. The system for providing synchronization between screens as recited in claim 1, wherein the handheld computing device is further configured to perform zoom operation on the second display, and the zoom operation indicates rendering the scene in zoomed or enlarged view.

6. The system for providing synchronization between screens as recited in claim 1, wherein the handheld computing device is further configured to:
   detect, using one or more sensors present on the handheld computing device, a position of the handheld computing device;
   if the position of the handheld computing device is closer to an observer, rendering the scene on the second display in zoom mode, wherein the zoom mode renders the scene in enlarged view so that an observer can view the asynchronous visual events in enlarged view; and
   if the position of the handheld computing device is away from the observer, rendering the scene on the second display in normal mode, wherein the normal-mode renders the scene in normal-mode.

7. The system for providing synchronization between screens as recited in claim 6, wherein:
   the scene comprises scene of a battlefield;
   the normal-mode comprises displaying a map of the battlefield; and
   map displays route from the current location of the remote computing devices to the location of the asynchronous events.

8. A method for providing synchronization between screens, the method comprising:
   mounting a first display in a fixed position;
   coupling a computer system to the first display; and
   establishing an optical link between the first display and a second display, wherein:
      the second display is a part of a handheld computing device;
      the first display is larger than the second display;
      the first display has a wider field of view than the second display;

rendering a virtual reality model of a scene with moving objects and asynchronous visual events on the first display, wherein the scene and the asynchronous visual events rendered on the first display are also rendered on the second display;

embedding a machine-readable code in asynchronous visual events;

reading the machine-readable code by the handheld computing device;

scanning the machine-readable code, having coordinates of the asynchronous visual events and coordinates of the moving objects within the scene, by the handheld computing device;

transmitting the coordinates of the asynchronous visual events and the coordinates of the moving objects within the scene to one or more remote computing devices by the handheld computing device using one or more wireless link; and transforming the virtual reality model of the scene rendered on the first display in response to transmission of the coordinates of the asynchronous visual events and the coordinates of the moving objects within the scene.

9. The method for providing synchronization between screens as recited in claim 8, wherein:
the transforming the virtual reality model comprising producing visual effects on the first display; and
the visual effects comprise firing by remote artillery units associated with the one or more remote computing devices, movement of the objects, indication that the scanning of the machine-readable codes has been successfully completed.

10. The method for providing synchronization between screens as recited in claim 8, wherein the one or more wireless link includes messaging.

11. The method for providing synchronization between screens as recited in claim 8, wherein:
the one or more wireless link includes voice commands;
the voice commands use Natural Language Processing (NLP) techniques for identifying verbal instructions present in the voice commands; and
the verbal instructions indicate actions to be taken by the remote computing devices.

12. The method for providing synchronization between screens as recited in claim 8, wherein the handheld computing device is further configured to perform zoom operation on the second display, wherein the zoom operation indicates rendering the scene in zoomed or enlarged view.

13. The method for providing synchronization between screens as recited in claim 8, wherein the handheld computing device is further configured to:
detect, using one or more sensors present on the handheld computing device, a position of the handheld computing device;
if the position of the handheld computing device is closer to an observer, rendering the scene on the second display in zoom mode, wherein the zoom mode renders the scene in enlarged view so that an observer can view the asynchronous visual events in enlarged view; and
if the position of the handheld computing device is away from the observer, rendering the scene on the second display in normal-mode, wherein the normal-mode renders the scene in normal-mode.

14. The method for providing synchronization between screens as recited in claim 13, wherein:
the scene comprises scene of a battlefield;
the normal-mode comprises displaying a map of the battlefield; and
route from the current location of the remote computing devices to the location of the asynchronous events.

15. A non-transitory computer-readable medium having instructions embedded thereon for providing synchronization between screens, wherein the instructions, when executed by one or more computers, cause the one or more computers to:
mount a first display in a fixed position;
couple a computer system to the first display; and
establish an optical link between the first display and a second display, wherein:
the second display is a part of a handheld computing device;
the first display is larger than the second display;
the first display has a wider field of view than the second display;
rendering a virtual reality model of a scene with moving objects and asynchronous visual events on the first display, wherein the scene and the asynchronous visual events rendered on the first display are also rendered on the second display;
embed a machine-readable code in asynchronous visual events;
read the machine-readable code by the handheld computing device;
scan the machine-readable code having coordinates of the asynchronous visual events and coordinates of the moving objects within the scene;
transmit the coordinates of the asynchronous visual events and the coordinates of the moving objects within the scene by the handheld computing device using one or more wireless link; and
transform the virtual reality model of the scene rendered on the first display in response to transmission of the coordinates of the asynchronous visual events and the coordinates of the moving objects within the scene.

16. The non-transitory computer-readable medium for providing synchronization between two screens, as recited in claim 15, wherein:
the transforming the virtual reality model comprising producing visual effects on the first display; and
the visual effects comprise firing by remote artillery units associated with the one or more remote computing devices, movement of the objects, indication that the scanning of the machine-readable codes has been successfully completed.

17. The non-transitory computer-readable medium for providing synchronization between screens as recited in claim 15, wherein the one or more wireless link includes messaging.

18. The non-transitory computer-readable medium for providing synchronization between screens as recited in claim 15, wherein:
the one or more wireless link includes voice commands;
the voice commands use Natural Language Processing (NLP) techniques for identifying verbal instructions present in the voice commands; and
the verbal instructions indicate actions to be taken by the remote computing devices.

19. The non-transitory computer-readable medium for providing synchronization between screens as recited in claim 15, wherein the handheld computing device is further configured to perform zoom operation on the second display, wherein the zoom operation indicates rendering the scene in zoomed or enlarged view.

20. The non-transitory computer-readable medium for providing synchronization between screens as recited in claim 15, wherein the handheld computing device is further configured to:
- detect, using one or more sensors present on the handheld computing device, a position of the handheld computing device;
- if the position of the handheld computing device is closer to an observer, rendering the scene on the second display in zoom mode, wherein the zoom mode renders the scene in enlarged view so that an observer can view the asynchronous visual events in enlarged view; and
- if the position of the handheld computing device is away from the observer, rendering the scene on the second display in normal-mode, wherein the normal-mode renders the scene in normal-mode.

21. The non-transitory computer-readable medium for providing synchronization between screens as recited in claim 20, wherein:
- the scene comprises scene of a battlefield;
- the normal-mode comprises displaying a map of the battlefield; and
- route from the current location of the remote computing devices to the location of the asynchronous events.

\* \* \* \* \*